March 11, 1969    B. PRÖBSTING    3,431,712
ENSILAGE HARVESTER
Filed Feb. 5, 1968
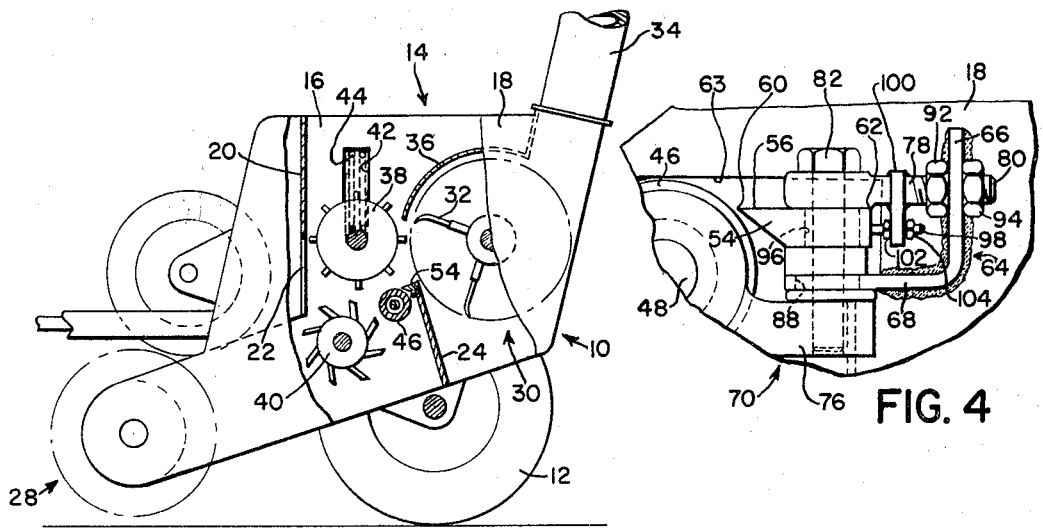
FIG. 1
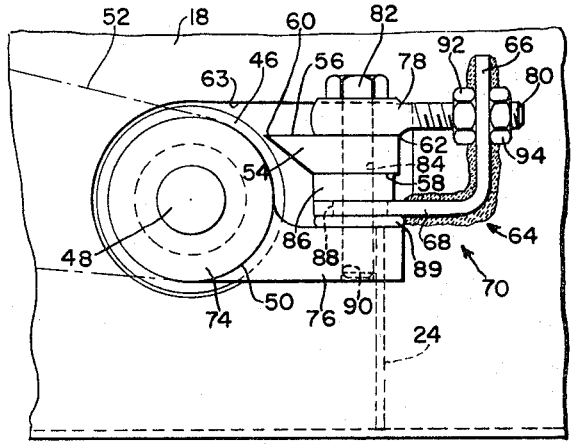
FIG. 2
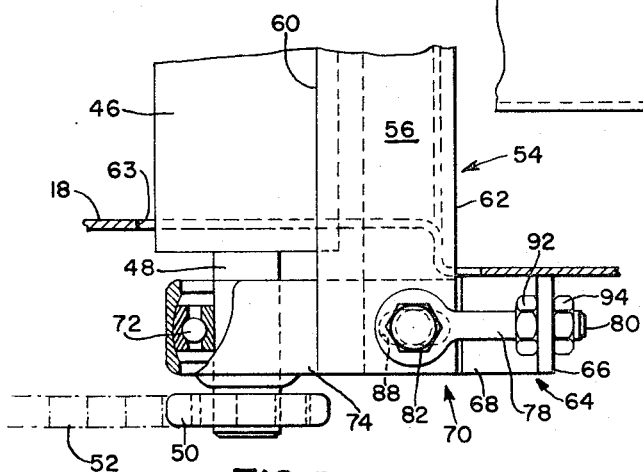
FIG. 3
FIG. 4

United States Patent Office 3,431,712
Patented Mar. 11, 1969

3,431,712
ENSILAGE HARVESTER
Bernhard Pröbsting, Zweibrucken, Germany, assignor to Deere & Company, Moline, Ill., a corporation of Delaware
Filed Feb. 5, 1968, Ser. No. 702,972
Claims priority, application Germany, Feb. 15, 1967, D 52,279
U.S. Cl. 56—23　　　　　　　　　　　　　　　6 Claims
Int. Cl. A01d 43/00, 55/18; B02c 11/04

ABSTRACT OF THE DISCLOSURE

An ensilage harvester having a transverse cylinder-type cutterhead and a forward crop pickup device, which removes the crop from the field and delivers it rearwardly to a pair of feed rolls, which feed the crop rearwardly to the cutterhead over a transverse shear bar. A relatively small smooth feed roll is disposed immediately forward of the shear bar, the forward edge of which serves as a stripper for the smooth feed roll. The smooth feed roll is adjustable with the shear bar so that the stripping function of the shear bar is unaffected when the shear bar is adjusted.

BACKGROUND OF THE INVENTION

This invention relates to ensilage harvesters and more particularly to an improved feeding mechanism and shear bar on an ensilage harvester having a cylinder-type cutterhead.

In ensilage harvesters which utilize a cylinder or reel-type cutterhead, a stationary knife or shear bar is conventionally provided at the cutterhead periphery, the crop being fed over the shear bar and generally radially into the cutterhead, which, of course, cooperates with the shear bar to reduce the crop. For proper operation of the cutterhead, it is necessary that the shear bar be maintained in proper registry with the cutterhead, and, therefore, it is conventional to provide means for adjusting the shear bar relative to the cutterhead so that the proper clearance between the shear bar and cutterhead may be maintained. Generally, on such machines, the crop is fed rearwardly from the harvesting unit to the cutterhead by a number of feed rolls, which are axially parallel to the cutterhead and disposed between the cutterhead and the harvesting means, the crop being fed over the shear bar and to the cutterhead after passing between oppositely rotating upper and lower feed rolls. Varying numbers and outer surface configurations are provided for the feed rolls on different machines. However, in many, a relatively smooth lower feed roll is provided closely adjacent to the shear bar to assist in the movement of the crop over the shear bar and to the cutterhead. Generally, a stripper or scraper is mounted closely adjacent to the periphery of the smooth feed roll to prevent wrappage of crop material around the feed roll.

To simplify the construction of the shear bar and stripper, it has been known to position the shear bar so that one side of the shear bar is closely adjacent to the cutterhead, while the other side of the shear bar is adjacent to the smooth feed roll, so that the shear bar also functions as the feed roll stripper. However, with such an arrangement, adjustment of the shear bar relative to the cutterhead would also change the relationship between the shear bar and the feed roll, so that the proper clearance between the portion of the shear bar which functions as the stripper and the feed roll cannot be maintained. Thus, although such an arrangement is relatively simple and inexpensive, it has not found use on modern ensilage harvesters.

SUMMARY OF THE INVENTION

According to the present invention, a shear bar is provided which will also function as a stripper for the feed roll and which is adjustable relative to the cutterhead without changing its relationship with the feed roll.

More specifically, the shear bar is mounted on an adjustable mounting structure which also carries the feed roll, so that the feed roll is adjusted with the shear bar to maintain the relationship between the feed roll and shear bar.

Another feature of the invention resides in the simple and economic construction of the shear bar and feed roll stripper and in the adjusting means therefor.

BRIEF DESCRIPTION OF THE DRAWINGS

FIG. 1 is a side elevation view of an ensilage harvester with portions of the harvester omitted and with portions of the housing removed to more clearly disclose the invention.

FIG. 2 is an enlarged side elevation view of a portion of the cutterhead housing, showing one end of the shear bar and its mounting.

FIG. 3 is a plan view of the end of the shear bar and feed roll shown in FIG. 2.

FIG. 4 is an end view of the shear bar mounting similar to FIG. 2, but showing a slight modification of the mounting.

DESCRIPTION OF THE PREFERRED EMBODIMENTS

The ensilage harvester chosen for purpose of illustration includes a mobile main frame, indicated generally by the numeral 10, mounted on a pair of laterally spaced wheels 12, only the right-hand wheel 12 being shown in FIG. 1. Mounted on the frame is a housing, indicated in its entirety by the numeral 14, the housing 14 including upright, opposite side panels 16 and 18 respectively, a portion of the side panel 18 being removed in FIG. 1 to more clearly disclose the invention. An upper, forward wall portion 20 extends between the opposite side panels 16 and 18 above a forward crop inlet opening 22. Also extending between the opposite side walls is a lower front wall portion 24, which is spaced rearwardly of the inlet opening 22.

Forwardly disposed on the frame is a crop harvesting means, indicated generally by the numeral 28, the harvesting means being shown as a crop pickup device in the illustrated embodiment, which removes the crop from the field as the machine advances and delivers it rearwardly through the inlet opening 22.

An axially transverse cylinder-type cutterhead 30 is mounted in the housing and includes a plurality of knives 32 which generate a cylinder as the cutterhead 30 rotates, the cutterhead rotating in a counterclockwise direction in FIG. 1 in the conventional manner, and impelling the reduced crop upwardly and rearwardly through a tangentially extending discharge spout 34, only the lower portion of which is shown in FIG. 1. An arcuate shroud 36, concentric with the cutterhead, extends forwardly from the discharge spout 34 and terminates above the front wall portion 24 closely adjacent to the cutterhead, enclosing the upper forward portion of the cutterhead.

Upper and lower feed rolls 38 and 40 respectively extend between the opposite sides of the housing rearwardly of the inlet opening 22 to engage the crop moving rearwardly through the inlet opening 22 and move it rearwardly toward the cutterhead 30. Both rolls have outwardly extending teeth to positively engage the crop, which passes between the rolls, the upper roll 38 rotating in a counterclockwise direction as seen in FIG. 1 and the lower roll rotating in a clockwise direction. The upper roll 38 is free to float upwardly in vertical slots 42 in the side walls 16 and 18 to vary the clearance between the feed rolls 38 and 40, the roll being biased downwardly toward the lower feed roll 40 by a spring mechanism 44. The feed rolls, as well as the cutterhead and harvesting means 28, are driven by conventional drive means (not shown).

A smooth feed roll 46 is mounted between and parallel to the lower feed roll 40 and the cutterhead 30 and has a relatively smooth outer surface substantially smaller in diameter than the feed rolls 38 and 40. The feed roll 46 has an axial shaft 48, on the left-hand end of which is mounted a chain sprocket 50 driven by a conventional drive chain 52, which forms a part of the feed roll drive.

An elongated, transversely extending shear bar or stationary knife, indicated generally by the numeral 54, extends between the opposite sides 16 and 18 adjacent to and forwardly of the periphery of the cutterhead 30 and adjacent to and rearwardly of the feed roll 46. The shear bar has a flat upper surface 56 and a flat lower surface 58 parallel to the upper surface, the lower surface being substantially narrower than the upper surface so that the shear bar has a generally trapezoidal cross section, the rearward angles of which are right angles, while the upper forward angle is an acute angle. The upper forward or acute angle edge 60 is closely adjacent to the outer surface of the feed roll 46, so that the edge 60 functions as a stripper for the smooth feed roll 46, preventing the wrappage of material around the roll. The upper rearward edge 62 is closely adjacent to the cutterhead periphery, so that the edge 62 functions as a shear or knife edge for the cutterhead.

The opposite ends of the feed roll 46 and the shear bar 54 extend through suitable openings 63 in the side walls 16 and 18. A pair of L-shaped brackets 64 are attached to the respective side walls adjacent the openings 63, only the left side bracket 64 being shown in the drawings, the right side bracket being identical to the left side bracket. The brackets 64 project outwardly from the respective side walls, and each bracket includes a vertical leg 66 and a horizontal fore-and-aft extending leg 68.

The opposite ends of the shear bar 54 and the feed roll 46 are mounted for generally fore-and-aft adjustment on the respective brackets 64, which in turn are rigidly connected to the housing 14 and consequently the main frame 10, so that both the feed roll and shear bar are adjustable relative to the cutterhead 30, which is carried in a fixed position on the housing 14 and main frame 10. A pair of supporting structures, indicated generally by the numeral 70, support the opposite ends of both the feed roll 46 and the shear bar 54, only the left-hand supporting structure 70 being shown in the drawings and described herein, the right-hand supporting structure being identical to the left-hand structure. The supporting structure includes a bearing 72, which journals the end of the shaft 48 and a bearing housing 74, which carries the bearing and has a generally rearwardly and tangentially extending arm 76. An eyebolt 78 has an axially vertical opening and a rearwardly extending threaded shank 80, which slidably extends through an aperture in the vertical leg 66 of the bracket 64. A conventional bolt 82 extends downwardly through the eye in the bolt 78, through a vertical bore 84 in the shear bar having substantially the same diameter as the bolt 82, through a similar hole in an elongated support member 86 underlying the shear bar 54, through a fore-and-aft extending slot 88 in the horizontal leg 68 of the bracket 64, the slot 88 having substantially the same width as the diameter of the bolt 82 but being elongated in a fore-and-aft direction, and through an apertured bearing member 89, the lower threaded end of the bolt 82 being threaded into a vertical threaded bore 90 in the rearwardly extending arm 76 of the housing 74. Thus, the bolt 82 clamps the stacked eyebolt 78, shear bar 54, support member 86, bearing member 89, and housing arm 76 to the horizontal leg 68 of the bracket 64, although the bolt can be loosened to permit fore-and-aft sliding of the entire supporting structure 70 within the limits defined by the front and rear ends of the slot 88 in the bracket leg 68.

The fore-and-aft position of the supporting structure 70, and consequently of the shear bar and feed roll carried thereby, may be adjusted by a pair of adjusting nuts 92 and 94, which respectively are threaded on the shank 80 of the eyebolt 78 on opposite sides of the vertical leg 66 of the bracket 64. The supporting structure is locked in the selected position by threading the front and rear adjusting nuts 92 and 94 tightly against the bracket.

When it is necessary to adjust the shear or knife edge 62 on the shear bar 54 relative to the cutterhead to establish a proper clearance between the cutterhead and shear edge, the bolt 82 is loosened a sufficient amount to permit fore-and-aft sliding movement of the supporting structure, and the adjusting nuts 92 and 94 are rotated in the same direction, to move the entire supporting structure, the direction of rotation of the nuts, of course, controlling the direction of movement of the supporting structure. As is apparent from the above, the opposite ends of the shear bar are independently adjustable, so that the supporting structures on both sides of the housing must generally be adjusted for proper adjustment of the shear bar clearance. As is also apparent, the feed roll 46 moves with the shear bar 54 so that the relationship between the upper rear or stripper edge 60 of the shear bar and the feed roll periphery is not affected, automatically maintaining the proper clearance between the feed roll and the stripper edge 60.

A slight modification of the invention is shown in FIG. 4, wherein means are provided for adjusting the shear bar relative to the feed roll to compensate for wear on the stripper edge 60. In this embodiment, a fore-and-aft slot 96 is provided through the shear bar to permit fore-and-aft adjustment of the shear bar on the bolt 82. The position of the shear bar relative to the bolt is established by a fore-and-aft extending threaded member 98 rigidly attached to and extending rearwardly from the rearward surface of the shear bar. The threaded member 98 extends through an aperture in a bracket 100 rigidly depending from the eyebolt 78, the position of the shear bar relative to the eyebolt being established by a pair of adjusting nuts 102 and 104 respectively threaded on the member 98 and engageable with the front and rear sides of the bracket 100. Thus, threading the adjusting nuts 102 and 104 in one direction will shift the shear bar rearwardly relative to the eyebolt and consequently rearwardly relative to the feed roll 46, while threading the nuts in the opposite direction will shift the shear bar forwardly and closer to the feed roll. Of course, adjustment of the shear bar relative to the feed roll would normally require readjustment of the shear bar and feed roll in unison via the previously described procedure to establish the proper clearance between the shear edge 62 and the cutterhead.

As is apparent, the shear bar 54 functions as both the shear bar for the cutterhead and the stripper for the feed roll 46, so that a simple and economic arrangement of components is possible. As is also apparent, this is accomplished without sacrificing the necessary adjustments to maintain the proper clearances between the shear bar and the cutterhead and between the stripper and the feed roll.

I claim:

1. In a forage harvester having a mobile main frame adapted to advance over a field and including a substantially enclosed cutterhead housing having opposite, upright side walls, a rotary cutterhead mounted in the housing axially transverse to the side walls and having knife means which generate a cylinder as the cutterhead rotates, a crop harvesting means carried by the main frame and adapted to remove the crop from the field; and crop feeding means adapted to deliver the crop from the harvesting means toward the cutterhead, the improvement comprising: an elongated rotatable feed roll disposed axially parallel to the cutterhead and adapted to rotatably engage crops moving toward the cutterhead; an elongated stripper means associated with said feed roll parallel to and between said feed roll and cutterhead and adapted to prevent wrappage of crop material around said feed roll; an elongated shear knife cooperating with the cutterhead and disposed between said feed roll and the cutterhead; and means adjustably mounting said feed roll, stripper means and shear knife on the main frame for adjustment in unison relative to the cutterhead, the adjustment varying the clearance between the shear knife and the cutterhead.

2. The invention defined in claim 1 wherein the shear knife and stripper means are formed by a single elongated bar having at least two longitudinal edges and disposed parallel to and between the cutterhead and said feed roll, one of said edges being closely adjacent to the feed roll and forming said stripper means, the other of said edges registering with the cutterhead, and forming said shear knife.

3. The invention defined in claim 2 wherein the mounting means includes a pair of support structures respectively journaling the opposite ends of said feed roll and rigidly supporting the opposite ends of the bar, and a pair of adjusting means respectively operative between the opposite side walls and the respective support structures for adjustably positioning the support structures on the respective side walls.

4. The invention defined in claim 3 wherein said support structures are adjustable only in a generally radial direction relative to the cutterhead.

5. The invention defined in claim 4 wherein each adjusting means includes a bracket attached to the respective side wall and thread means operative between the bracket and the respective support structure to adjust the support structure in response to rotation of the thread means.

6. The invention defined in claim 2 wherein the bar has a relatively smooth upper surface extending between said longitudinal edges which form the shear knife and stripper means, the crop moving over the feed roll and the upper surface of the bar above the center line of the feed roll to the cutterhead.

References Cited

UNITED STATES PATENTS 3,023,560    3/1962    Krahn _____ 56—23
3,342,231    9/1967    Waldrop _____ 146—107

ANTONIO F. GUIDA, *Primary Examiner.*

U.S. Cl. X.R.

146—107, 120